Patented Jan. 30, 1940

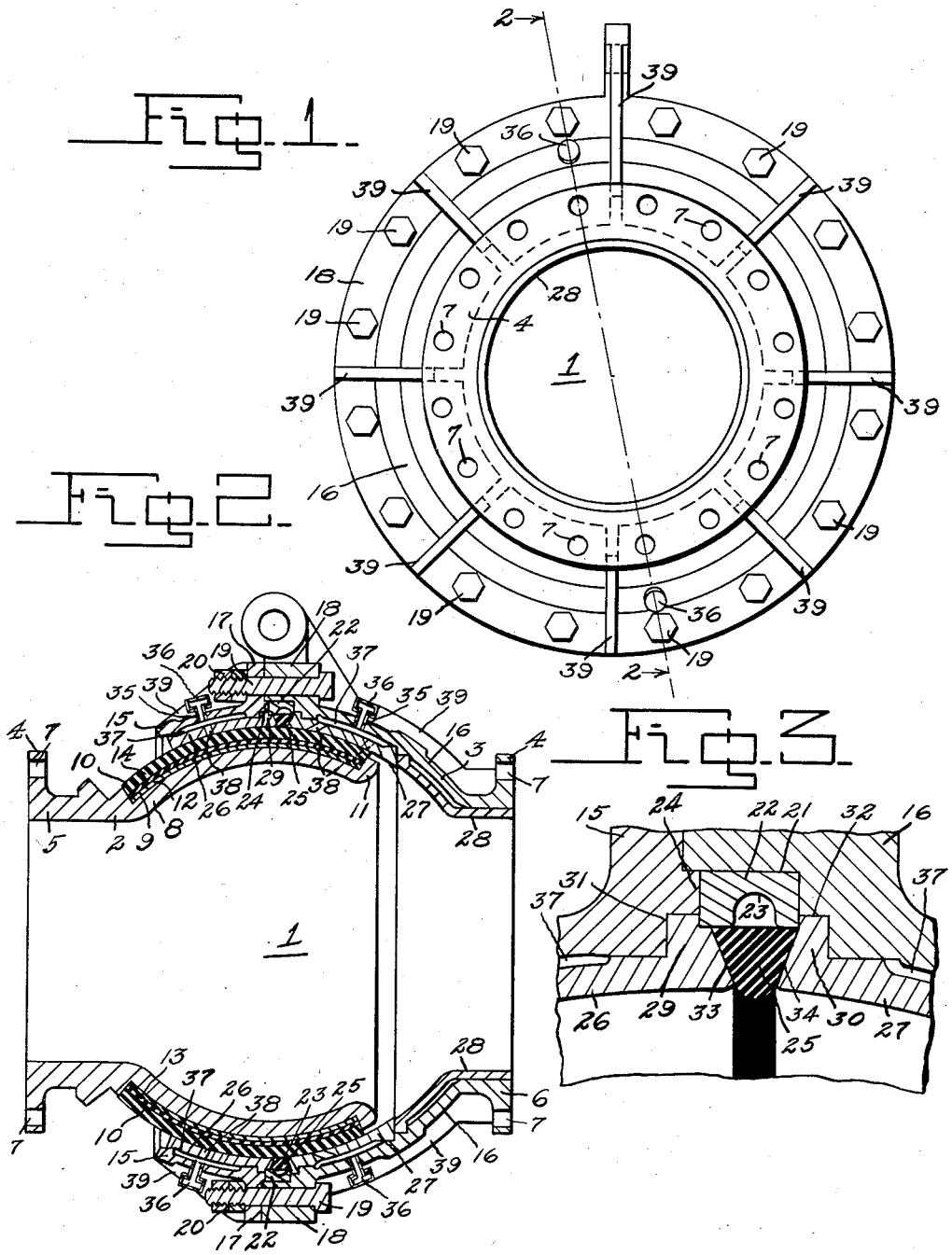

2,188,314

UNITED STATES PATENT OFFICE 2,188,314

PIPE JOINT

Frederick C. Scheffauer, San Francisco, Calif.

Application April 4, 1939, Serial No. 265,913

4 Claims. (Cl. 285—94)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to pipe joints, more particularly it is directed to a pipe joint of the ball and socket type adapted to permit limited relative angular movement of the pipes to which the joint may be attached.

One object of the invention is to provide a flexible connection between pipes used on side pipe type hopper dredges and pipe line dredges or the like.

Another object of this invention is to provide a ball and socket joint of such construction as to form a watertight seal between the ball and socket portion of the joint and which may be connected to adjacent ends of two sections or lines of pipes, even when said sections or lines of pipe are at an angle to each other.

Another object of the invention is to provide an improved ball and socket joint for pipes which is simple in construction, easy to apply and remove from the pipes to which it may be connected, inexpensive to manufacture and which is not liable to become out of order.

With the above and other objects and advantages in view, the invention consists of certain features of construction and operation of parts which will hereinafter appear and in which Fig. 1 is an end elevation of a pipe joint, embodying the invention;

Fig. 2 is a longitudinal sectional view of the joint taken on the line 2—2 of Fig. 1, and Fig. 3 is an enlarged fragmentary detail sectional view of the joint.

In the illustrated embodiment characterizing the invention, 1 designates generally the complete assembled joint which comprises a male coupling member 2 and a female coupling member 3, each having a radial flange 4 on their outer ends 5 and 6 respectively, containing a series of bolt openings 7 for the reception of any suitable bolts, whereby the coupling members 2 and 3 may be connected to adjacent ends of two sections of pipe (not shown).

The male coupling member 2 is preferably made of chrome nickel steel and has a semi-globular or spherically curved hollow ball portion 8 which projects into the female coupling member 3. The ball portion 8 of the joint is provided with an annular groove 9 on its external surface which extends longitudinally across the ball portion to adjacent the inner end thereof and provides a seat for a jacket or cover 10 which is held in place by a shoulder 11 formed on the inner end of the ball portion.

The jacket 10 in the present illustration is made of a plurality of layers of different types of rubber, as illustrated in Fig. 2, the first layer 12 of the jacket consisting of hard rubber base stock of suitable thickness, which is seated within the groove 9 against the steel ball portion of the male coupling member. On the first layer of hard rubber 12 is placed a cushion of elastic gum 13 of substantially the same thickness as the first layer of rubber and a third layer 14 made of highly abrasive resisting tough rubber of fine texture is placed on the layer of elastic gum 13.

The female coupling member 3 constitutes the socket portion of the joint and is formed by two socket sections 15 and 16 which are preferably of soft steel. The socket section 15 is provided at its inner end with a radial flange 17 and the socket section 16 is provided at its inner end with a cylindrical flange 18. The two socket sections 15 and 16 are suitably connected together by means of the bolts 19 and nuts 20, the said bolts 19 projecting through a series of aligned openings provided in the radial and cylindrical flanges 17 and 18 respectively of the socket sections 15 and 16 of the female coupling member. Referring more particularly to Fig. 3 the socket section 16 of the female coupling member is counterbored at 21 providing an annular seat for a separator ring 22 made preferably of stainless steel and containing an annular groove 23 for a purpose which will hereinafter appear, and the section 15 of the female coupling member 3 is provided with an annular tongue 24 which is adapted to abut against one side of the separator ring.

An annular gasket 25 made of any suitable material, such as tough elastic rubber, dovetailed in cross-section, is fitted against the lower surface of the separator ring 22 with the upper surface of the gasket bridging the annular groove 23 formed in the separator ring. The socket section 15 of the female coupling member 3 is lined with a manganese bronze liner 26 and the socket section 16 is lined with a manganese bronze liner 27 and with a steel liner 28, these liners or shields 26, 27 and 28 acting as packing glands. The inner ends of the manganese bronze liners 26 and 27 are formed with opposed annular shoulders 29 and 30 respectively, which fit into annular recesses 31 and 32 formed in the sections 15 and 16 and abut against a portion of the separator ring 22. The shoulders 29 and 30 have opposed surfaces 33 and 34 which are inclined to correspond to and contact with the opposite sides of the rubber gasket 25, for holding the gasket in leakproof engagement on the female coupling member 3 against the separator ring. The inner lower surface of the gasket 25 extends below the surfaces of the liners 26, 27 and 28, whereby the gasket may impinge against the rubber jacket 10 on the ball portion 8 of the joint to provide a complete seal against the entry of air or water through the joint, even after some wear has taken place, the volume of rubber of the gasket 25 which is displaced by the compression thereof against the rubber jacket 10 on the ball part 8 of the joint being adapted to enter the annular groove 23 on the separator ring 22.

In order to lubricate the ball and socket joint, openings 35 having suitable grease cups 36 engaging therewith, are formed in the socket sections 15 and 16 of the female coupling member 3, which openings 35 lead into complemental annular grooves 37 formed on the adjacent surfaces of the socket section 15 and liner 26 and socket section 16 and liner 27, where the lubricant may be conducted to the inner surfaces of the liners, and the outer surface of the rubber jacket 10 by means of suitably spaced holes 38. When the joint is connected to pipes under water that medium alone may furnish the necessary lubrication. Equally spaced ribs 39 may be integrally formed around the socket sections 15 and 16 of the female coupling member 3, as illustrated in Fig. 1.

By this construction when the joint is applied to pipes used on dredging operations, losses in dredging efficiency due to the entry of large percentages of water, through worn joints of the all steel type, will be eliminated by the permissible snug fit of the rubber jacketed ball portion 8 of the male coupling member 2 with the socket liners 26, 27 and 28 and the positive seal effected by the rubber gasket 25. The maintenance of positive seal conditions in the joint insures rapid and positive priming of a dredging pump where it is necessary or desirable to have pipes connected by the joint above the water surface in dredging operations.

It will thus be seen that there is provided a new and useful improvement in pipe joints, which is well adapted for all the purposes indicated. Even though there has herein been shown and described certain features of construction and operation of parts, it is nevertheless to be understood that various changes may be made therein without departing from the spirit and scope of the invention.

Having described my invention, what I claim as new and wish to secure by Letters Patent is:

1. In a pipe joint the combination of a male and female coupling member, said male coupling member including a hollow ball portion having a jacket thereon, an annular gasket dovetailed in cross-section and liners acting as packing glands carried by said female coupling member and adapted to engage the jacket on the ball portion of said male coupling member, and annular shoulders having inclined surfaces formed on one end of certain of said liners, said annular shoulders engaging in annular recesses formed on said female coupling member and the inclined surfaces on said shoulders conforming to and contacting with the sides of said annular gasket for holding it in a fixed position on said female coupling member.

2. In a pipe joint the combination of a male and female coupling member, said male coupling member including a hollow ball portion having a jacket thereon, and said female coupling member comprising a separator ring containing an annular groove, an annular rubber gasket engaging said separator ring adjacent to the annular groove thereof and liners acting as packing glands, said rubber gasket and liners adapted to engage the jacket on the ball portion of said male coupling member and said rubber gasket extending below said liners whereby upon engagement of said gasket with the jacket on the ball portion of said male coupling member, a portion of the rubber of said gasket is caused to be compressed into the annular groove of said separator ring.

3. In a pipe joint the combination of a male and female coupling member, said male member including a hollow ball portion having a jacket thereon, and said female coupling member formed by two socket sections detachably connected together, an annular seat formed on one of said socket sections, a separator ring mounted on said annular seat, an annular gasket engaging said separator ring, metal liners acting as packing glands on said socket sections, one end of certain of said metal liners contacting with and supporting said annular gasket against said separator ring, said annular gasket and said liners adapted to contact with the jacket on the ball portion of said male coupling member whereby a leakproof seal is provided between said joint.

4. In a pipe joint the combination of a male and female coupling member, said male coupling member including a hollow ball portion having a jacket thereon and said female coupling member formed by two socket sections detachably connected together, an annular seat formed on said socket sections, a separator ring mounted on said annular seat, an annular gasket engaging said separator ring, liners acting as packing glands carried by said female coupling member, said gasket and liners adapted to engage the jacket on the ball portion of said male coupling member for forming a leakproof seal between said joint, annular shoulders having inclined surfaces formed on one end of certain of said liners, said annular shoulders engaging in annular recesses formed on said female coupling member and said inclined surfaces on said shoulders conforming to and contacting with the sides of said annular gasket for holding it in a fixed leakproof position on said female coupling member.

FREDERICK C. SCHEFFAUER.